3,075,006
SURFACE ACTIVE AROMATIC POLYAMINO-
ACIDS AND THE METAL SALTS THEREOF
William Todd and Arthur Topham, Manchester, England, assignors to Imperial Chemical Industries Limited, London, England, a corporation of Great Britain
No Drawing. Filed Apr. 6, 1959, Ser. No. 804,127
Claims priority, application Great Britain Apr. 18, 1958
1 Claim. (Cl. 260—510)

This invention relates to novel aromatic polyamino acids and salts thereof and more particularly to the condensation products of bis-chloromethyl aromatic compounds with aromatic monoamino acids and salts of such acids.

Thus according to the present invention we provide novel aromatic polyamino acids and salts thereof obtained by condensing a bis-chloromethyl aromatic compound of the structure I $$X(CH_2Cl)_2 \qquad (I)$$

wherein X is a benzene or naphthalene nucleus which may or may not carry other substituents in addition to chloromethyl groups, with an aromatic amino acid or salt thereof of the structure II $$NH_2Y(Z)_n \qquad (II)$$

wherein Y is a benzene or naphthalene nucleus, Z is a sulphonic acid or carboxylic acid group or a corresponding metallic salt group, e.g. alkali metal salt, and $n$ is 1 or 2, and wherein Y may or may not carry other substituents in addition to $NH_2$ and Z.

I and II are condensed together preferably in equimolecular amounts although a small excess of one or other reactant may be employed if desired. The condensation may be performed in presence of acid binding agents to remove liberated hydrochloric acid, suitable acid binding agents are for example the carbonates and bicarbonates of alkali metals or the carbonates of alkaline earth metals, or other salts such as the phosphates or borates comonly employed as buffering agents. It is preferred to conduct the condensation in presence of water, optionally with addition of solvents such as acetone or ethyl alcohol which serve to minimise frothing and also to assist in bringing the reactants into solution.

Usually it is unnecessary to subject the condensation products to a purification process and they may be employed as solutions in the aqueous reaction media in which they are prepared. In those cases where the condensation products are precipitated by acidification of their solutions in water it is possible to remove impurities by filtering off the precipitated condensation product from the acidified liquor, washing the precipitate with water, and redissolving it in a suitable alkaline solution, for example aqueous sodium hydroxide.

The condensation products are surface active and may be employed in the paper, leather and textile industries as dispersing agents in the preparation of dispersions of solids in aqueous media, for example dispersions of colouring matters.

The invention is illustrated but not limited by the following examples in which parts and percentages are by weight.

Example 1

19.8 parts of sodium sulphanilate
17.5 parts of p-xylylene dichloride
11.0 parts of calcium carbonate
70.0 parts of water
25.0 parts of ethanol were stirred and heated on the steam bath under reflux, carefully at first on account of frothing. Stirring on the steam bath was continued for 16 hours and finally the ethanol was distilled off. 170 parts of water were added followed by 17.7 parts of concentrated hydrochloric acid. The precipitate was filtered off, washed with a little water and redissolved in dilute sodium hydroxide. The remaining calcium was precipitated as calcium carbonate by addition of sodium carbonate and removed by filtration. The yield was 60 parts of 29% solution of condensation product.

Example 2

35.0 parts of p-xylylene dichloride
39.6 parts of sodium sulphanilate
36.0 parts of sodium bicarbonate
200.0 parts of water
79.0 parts of acetone were stirred under reflux for 3 hours at the end of which time acetone was removed by distillation on a steam bath during a further period of 3 hours. 50 parts of water were added and the resulting solution was filtered to remove a small amount of sediment. The yield was 328 parts of a 25.9% solution of condensation product.

Example 3

22.5 parts of bis-chloromethylnaphthalene
18.0 parts of sodium bicarbonate
19.8 parts of sodium sulphanilate
100.0 parts of water
40.0 parts of acetone were stirred and heated under reflux for 19 hours. At the end of this time the acetone was removed by distillation. 50 parts of water were added and the resulting solution was filtered to remove a trace of sediment. The yield was 193 parts of a 24.7% solution of condensation product.

Example 4

86.5 parts of sulphanilic acid and 650 parts of water were stirred together and neutralised with 66 parts of 32% sodium hydroxide solution. 3.9 parts of sodium dihydrogen phosphate and 87.5 parts of p-xylylene dichloride were added to the mixture. The temperature was raised during 45 minutes to 93° C., sufficient 32% sodium hydroxide solution being added to maintain the mixture in a mildly alkaline condition (about 130 parts of 32% sodium hydroxide solution required). After cooling the solution of condensation product was ready for use.

Example 5

39.6 parts of sodium sulphanilate
35.0 parts of p-xylylene dichloride
22.0 parts of calcium carbonate
80.0 parts of water
32.0 parts of acetone were stirred together under reflux at 60°–65° C. for 1¾ hours. Acetone was then removed by distillation by raising the temperature to 95° C. during 20 minutes. Stirring was continued for a further period of ½ hour at 95° C. by which time the reaction mixture had become extremely viscous. A solution of 22 parts of sodium carbonate in 200 parts of water was added to the reaction mixture which was stirred on the steam bath for 16 hours. 100 parts of water were added and the solution filtered to remove precipitated calcium carbonate. The solution of condensation product was then ready for use.

Example 6

79.6 parts of the acid potassium salt of 2-naphthylamine-6:8-disulphonic acid of strength (to molecular weight 303) 76.1%
220.0 parts of water
25.6 parts of 32% sodium hydroxide solution 37.5 parts of p-xylylene dichloride
23.5 parts of calcium carbonate
16.0 parts of acetone were stirred and heated to 98° C. for 1¼ hours, the acetone being allowed to distil out. The mixture was stirred at 98° C. for a further 5 minutes and a solution of 25.6 parts of sodium carbonate in 100 parts of water was added. After stirring at 90°–100° C. for 1¼ hours the reaction mixture was cooled and filtered to remove calcium carbonate.

*Example 7*

109.6 parts of the acid sodium salt of 2-naphthylamine-4:8-disulphonic acid (paste of strength to molecular weight 303—55.5%)
90.0 parts of water
24.3 parts of 32% sodium hydroxide solution
37.5 parts of p-xylylene dichloride
23.5 parts of calcium carbonate
16.0 parts of methyl ethyl ketone were stirred under reflux at 80°–85° C. for 4 hours. 100 parts of water were added and the mixture raised to a temperature of 95° C., methyl ethyl ketone being allowed to distil off. Stirring of the reaction mixture was continued for a further ½ hour at 95° C. A solution of 25.6 parts of sodium carbonate in 100 parts of hot water was added and the mixture stirred for ½ hour at 95° C. Finally 100 parts of water were added and the solution of condensation product cooled and centrifuged to remove precipitated calcium carbonate.

*Example 8*

34.6 parts of metanilic acid
80.0 parts of water
25.6 parts of 32% sodium hydroxide solution
35.0 parts of p-xylylene dichloride
22.2 parts of calcium carbonate
16.0 parts of methyl ethyl ketone were stirred under reflux at 80°–85° C. for 3½ hours. Methyl ethyl ketone was then removed by distillation by raising the temperature to 95° C., at which temperature stirring was continued for a further ½ hour. A solution of 24 parts of sodium carbonate in 100 parts of hot water was added and stirring was continued at 95° C. for 1½ hours. At the end of this time 200 parts of water were added to the reaction mixture and the resulting solution was filtered to remove precipitated calcium carbonate.

*Example 9*

29.2 parts of p-aminobenzoic acid of strength 94%
80.0 parts of water
25.6 parts of 32% sodium hydroxide were stirred together at 50° C. 35 parts of p-xylylene dichloride, 22.2 parts of calcium carbonate and 16 parts of methyl ethyl ketone were then added. The mixture was stirred under reflux at 80°–90° C. for 3 hours, more water being added as required to keep the reaction mass fluid (165 parts of water required). A further 35 parts of water were then added and the condenser was not for distillation. Methyl ethyl ketone was removed by raising the temperature to 95° C. After stirring at 95° C. for ½ hour a solution of 24 parts of sodium carbonate in 100 parts of hot water was added. Stirring was continued at 95° C. for a further period of ½ hour and the mixture was then cooled and filtered to remove precipitated calcium carbonate.

What we claim is:

A member of the group consisting of the surface active aromatic polyamino acids, and the alkali metal salts thereof, obtained by condensing in aqueous medium, and in the presence of an acid-binding agent (1) a bis-chloromethyl-substituted aromatic compound of the structure:

$$X(CH_2Cl)_2$$

wherein X is a member selected from the group consisting of benzene and naphthalene radicals, with a substantially equimolar amount of (2) an amino-acid compound of the formula:

$$NH_2Y(Z)_n$$

wherein Y is a member selected from the class consisting of benzene and naphthalene radicals, Z is selected from the class consisting of a sulphonic acid group and the corresponding alkali metal salts thereof, and $n$ is an integer from 1 to 2.

References Cited in the file of this patent
UNITED STATES PATENTS
2,376,911    Graenacher et al. _____ May 29, 1945